H. S. AXCELL.
MACHINE FOR MAKING EGG FILLERS.
APPLICATION FILED JAN. 6, 1913.

1,206,496.

Patented Nov. 28, 1916.
11 SHEETS—SHEET 1.

Fig. 1

H. S. AXCELL.
MACHINE FOR MAKING EGG FILLERS.
APPLICATION FILED JAN. 6, 1913.

1,206,496.

Patented Nov. 28, 1916.
11 SHEETS—SHEET 4.

Fig. 8

H. S. AXCELL.
MACHINE FOR MAKING EGG FILLERS.
APPLICATION FILED JAN. 6, 1913.

1,206,496.

Patented Nov. 28, 1916.
11 SHEETS—SHEET 9.

UNITED STATES PATENT OFFICE.

HALGE S. AXCELL, OF CHICAGO, ILLINOIS, ASSIGNOR TO WILLIAM A. SCHURMANN, OF CHICAGO, ILLINOIS.

MACHINE FOR MAKING EGG-FILLERS.

1,206,496.  Specification of Letters Patent.  Patented Nov. 28, 1916.

Application filed January 6, 1913. Serial No. 740,346.

*To all whom it may concern:*

Be it known that I, HALGE S. AXCELL, a citizen of the United States of America, and resident of Chicago, Cook county, Illinois, have invented a certain new and useful Improvement in Machines for Making Egg-Fillers, of which the following is a specification.

My invention relates to machines for making egg fillers of that particular kind in which a plurality of parallel strips of sheet material, such as pasteboard, are interlocked with and held together by a plurality of similar strips extending at right angles thereto, the structure thus formed being provided with a plurality of rectangular cells or compartments for the eggs.

Generally stated, the object of my invention is to provide a novel and highly efficient machine for making egg fillers of the foregoing character.

Special objects are to provide an improved construction and arrangement whereby both sheets are punched at the same time—that is to say, whereby the sheet from which the longitudinal strips are formed is punched to produce the interlocking notches or openings at the same time that the punching is performed on the other sheet from which the transverse strips are formed; to provide a novel and efficient construction and arrangement of the knives for cutting the materials at the time they are brought together and interlocked in place; to provide an improved construction and arrangement whereby the sheet materials are fed into position with more certainty and accuracy than heretofore; and to provide certain details and features of construction tending to increase the general efficiency and serviceability of an egg filler machine of this particular character.

To the foregoing and other useful ends, my invention consists in matters hereinafter set forth and claimed.

In the acompanying drawings.

Figure 1:
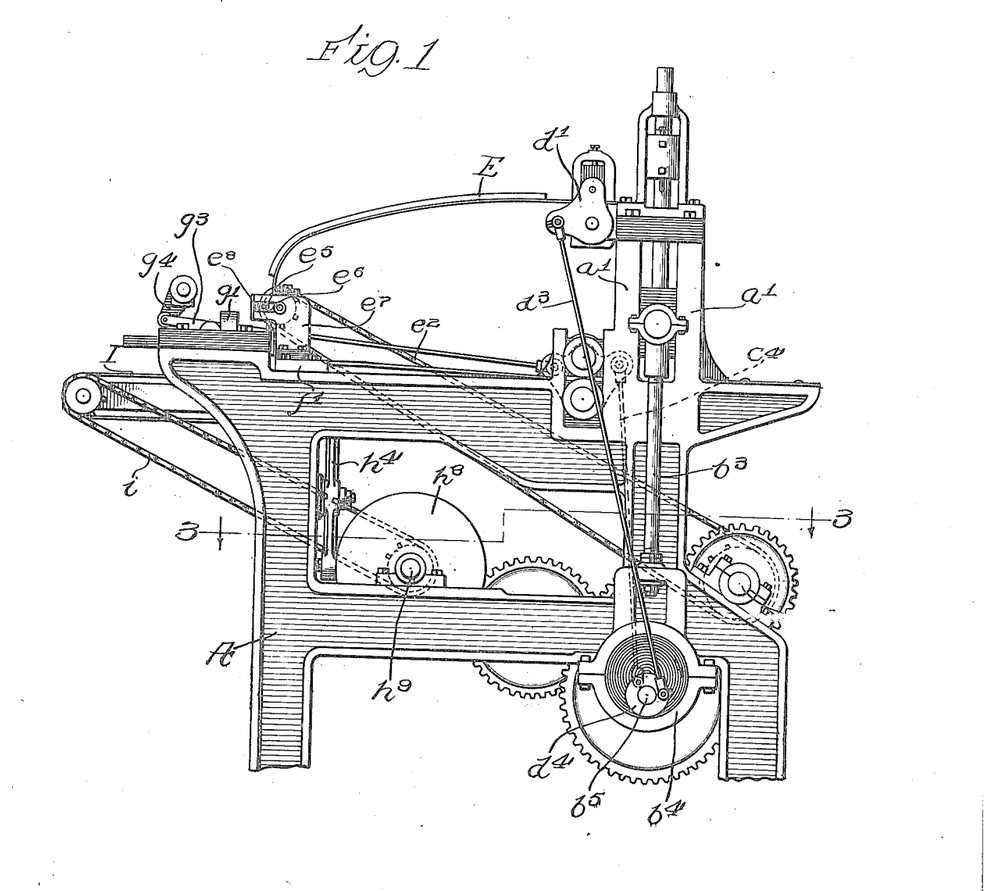
Figure 1 is a side elevation of an egg filler machine embodying the principles of my invention.
Figure 2:
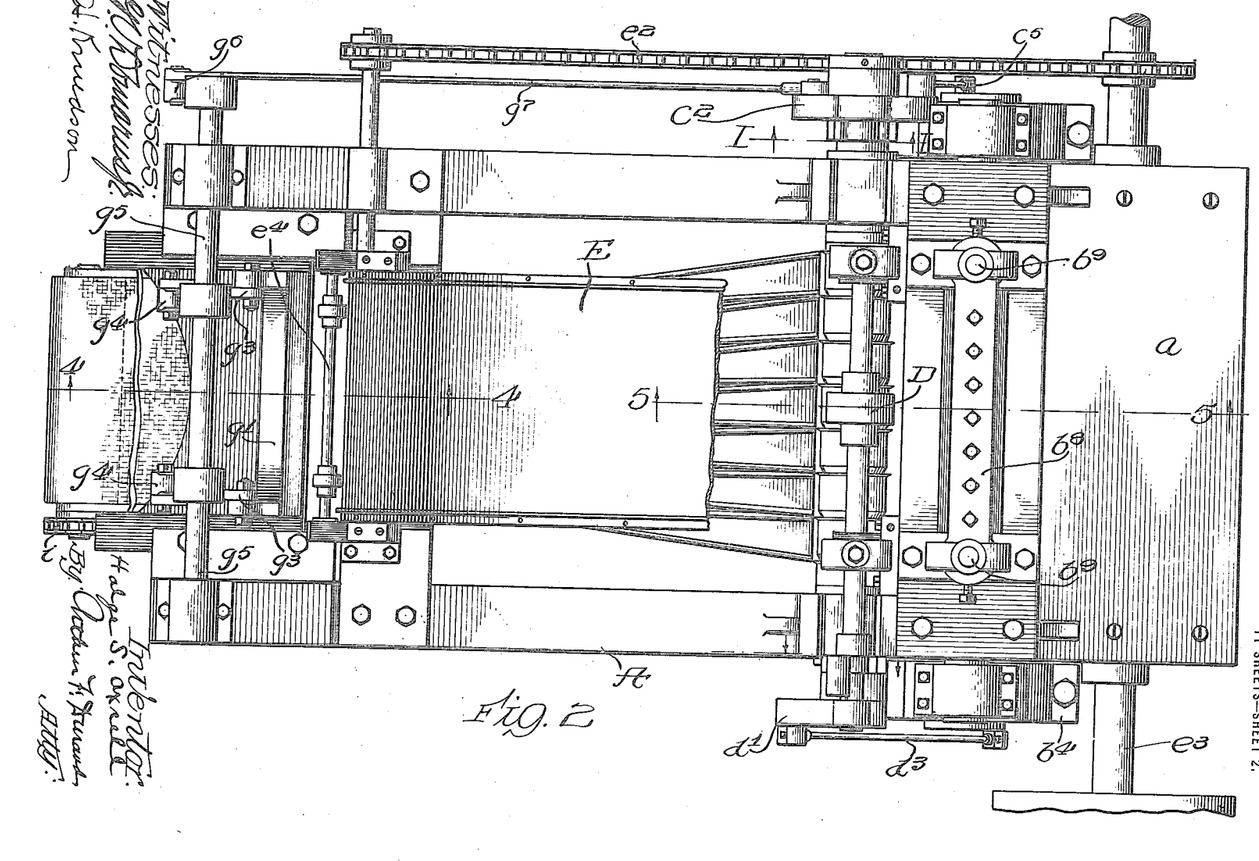
Fig. 2 is a plan of the said machine, on a larger scale, showing certain portions thereof broken away for convenience of illustration.
Figure 3:
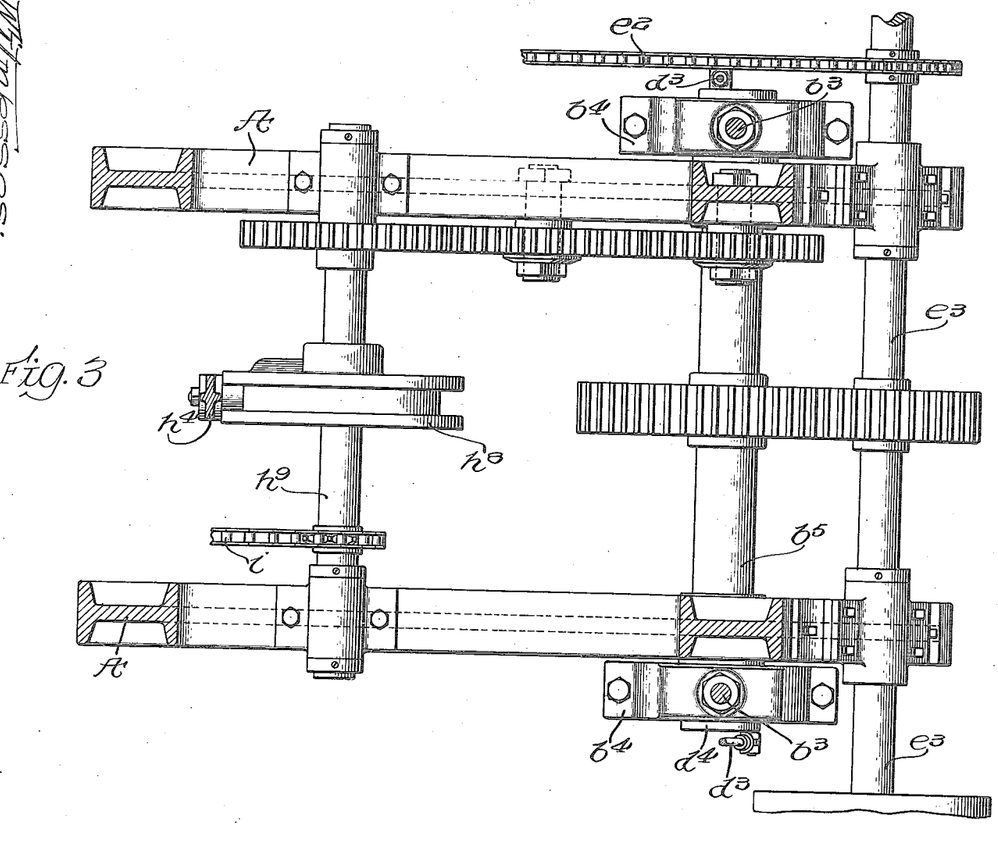
Fig. 3 is a horizontal section on line 3—3 in Fig. 1, on a larger scale, showing the gearing for operating the different elements.
Figures 4, 6:
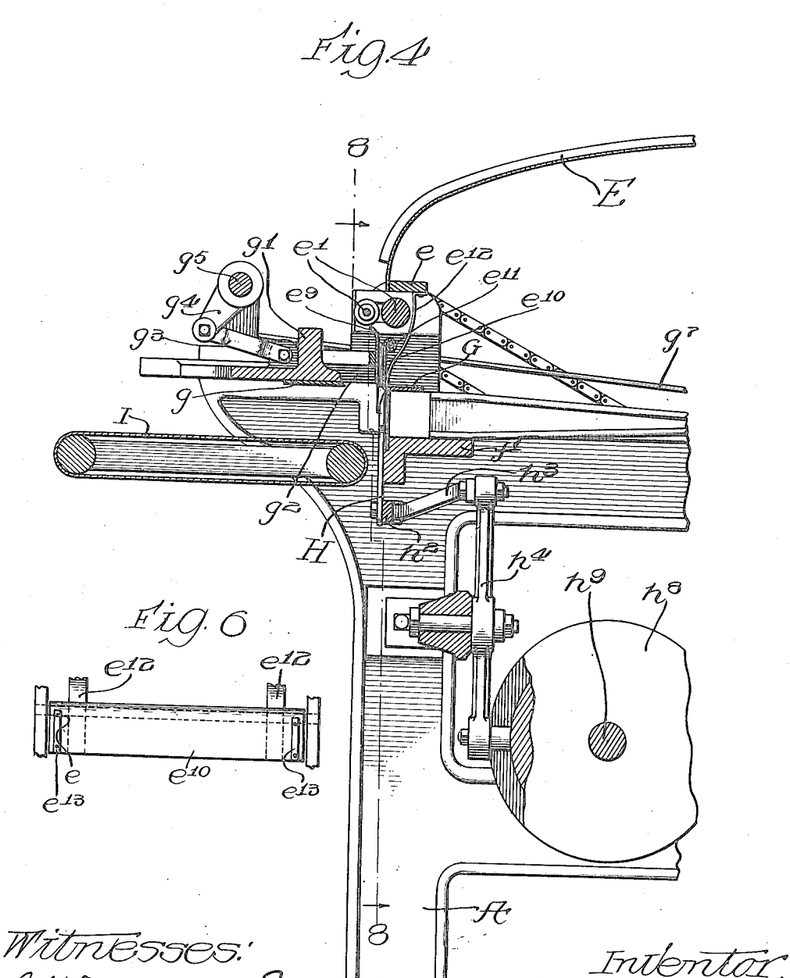
Fig. 4 is a longitudinal section on line 4—4 in Fig. 2.
Fig. 6 is a detail of one of the elements shown in Fig. 4.
Figure 5:
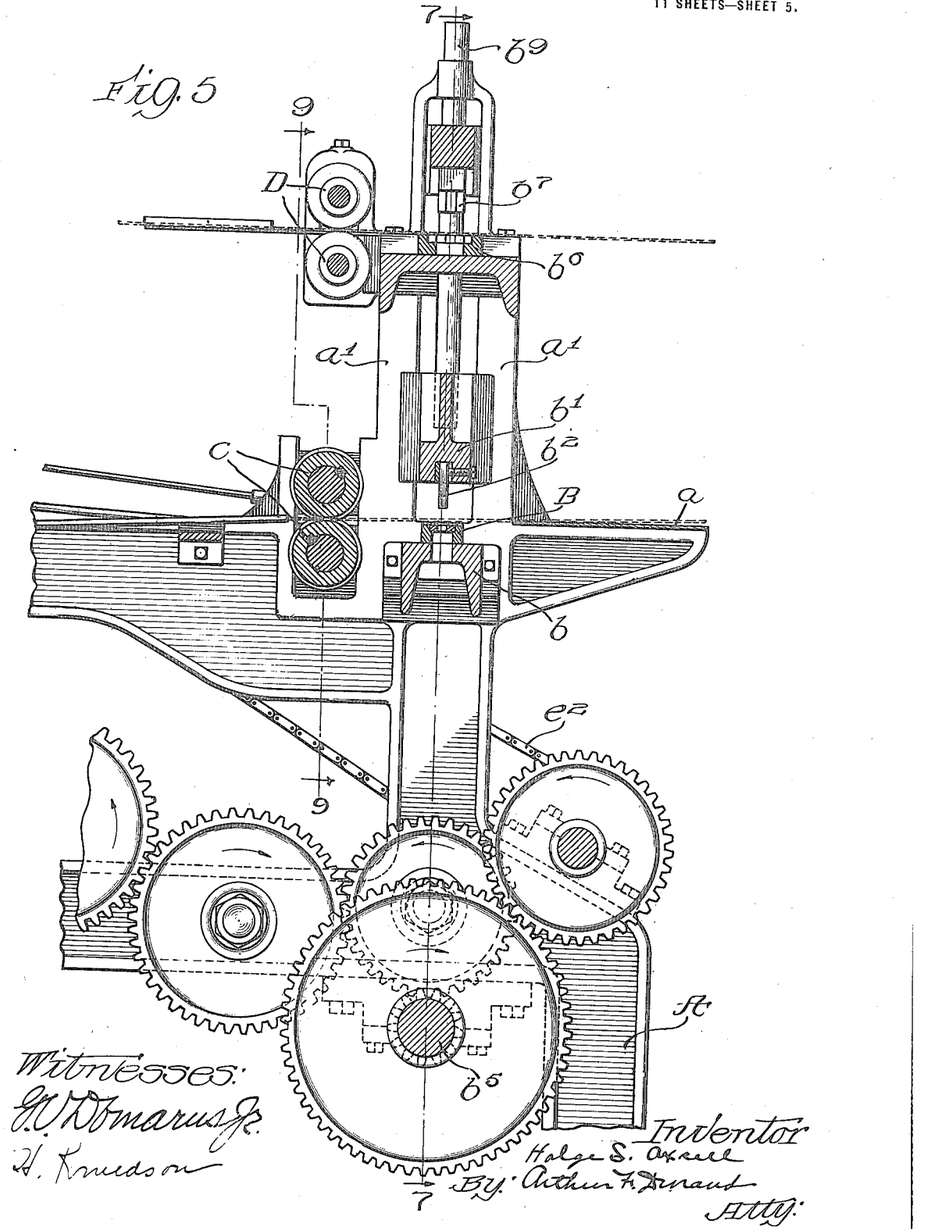
Fig. 5 is a longitudinal section on line 5—5 in Fig. 2.
Figure 7:
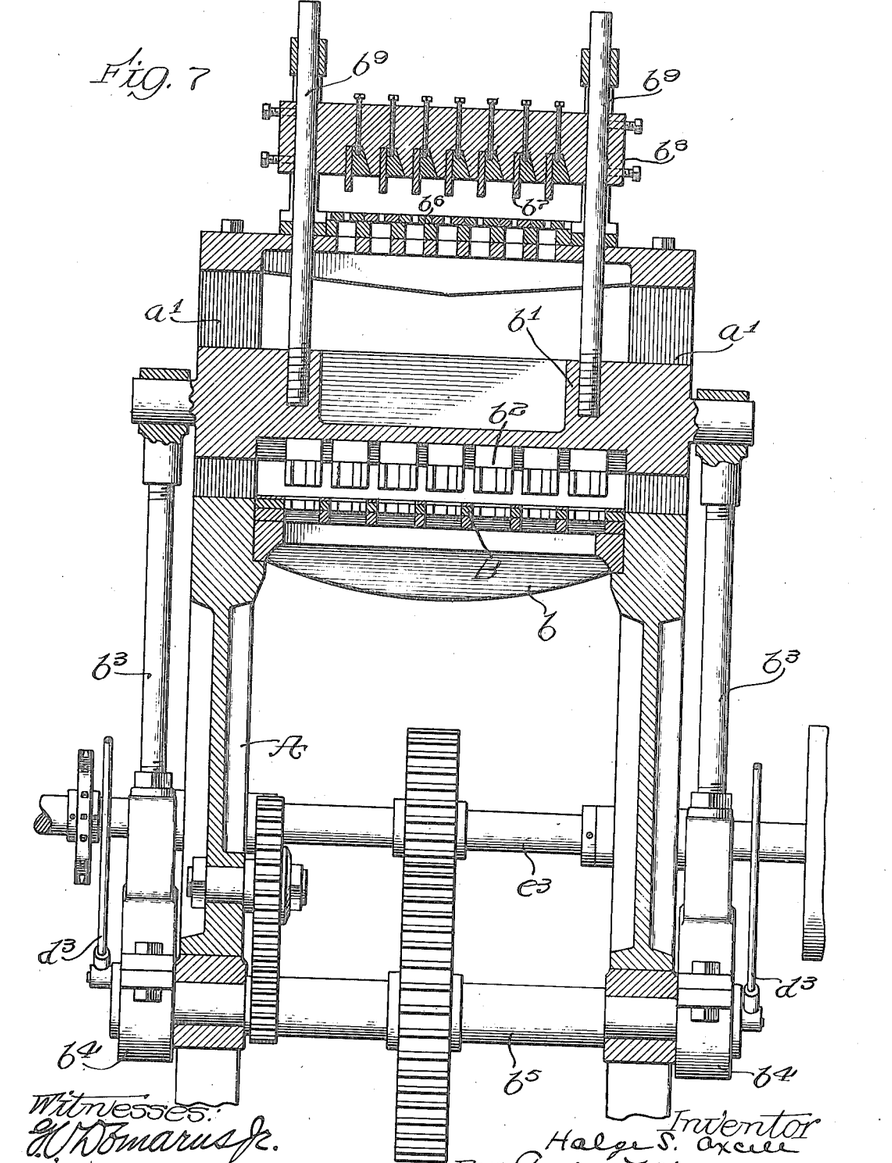
Fig. 7 is a vertical transverse section on line 7—7 in Fig. 5.
Figure 8:
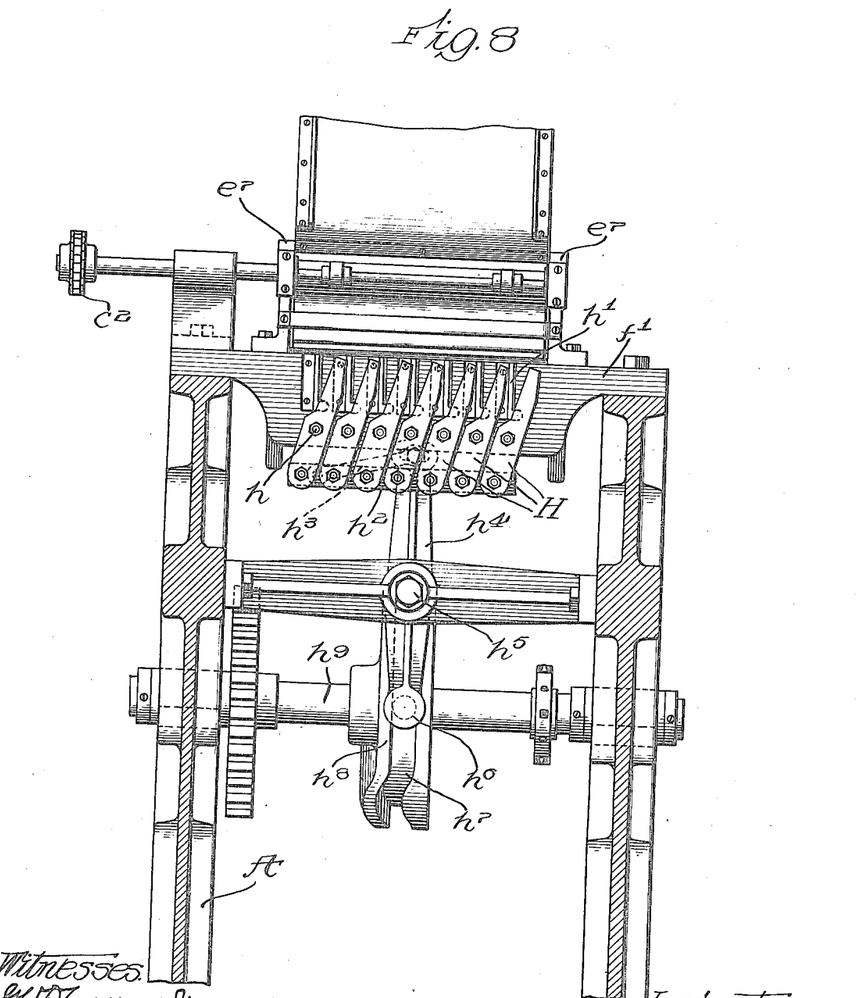
Fig. 8 is a vertical transverse section on line 8—8 in Fig. 4.
Figure 9:
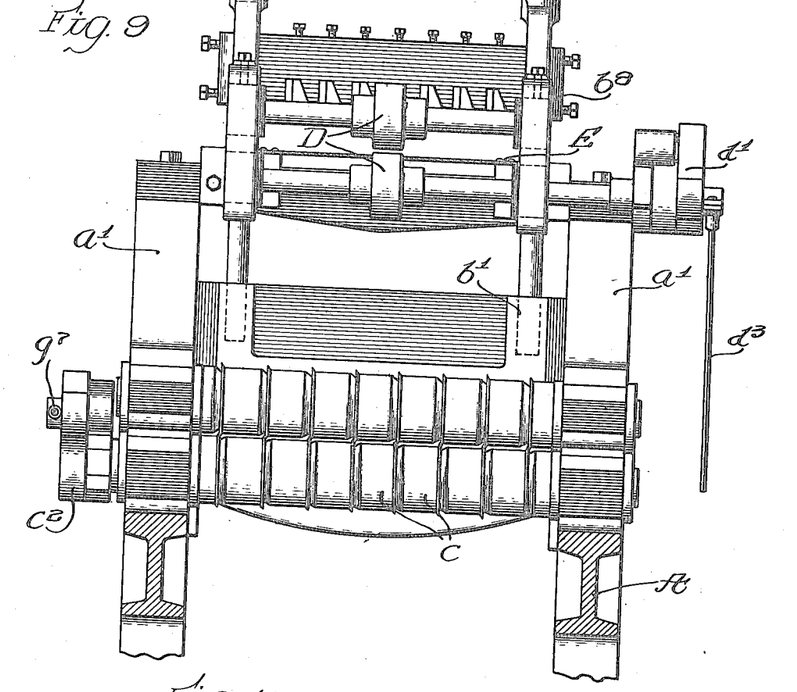
Fig. 9 is a vertical transverse section on line 9—9 in Fig. 5.
Figure 10:
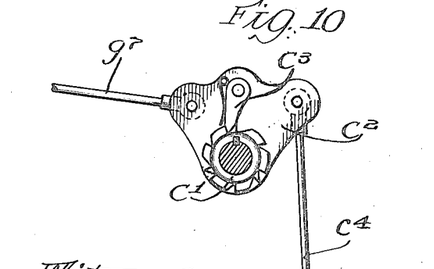
Fig. 10 is a detail sectional view showing the ratchet mechanism for operating the lower feed rolls.
Figure 11:
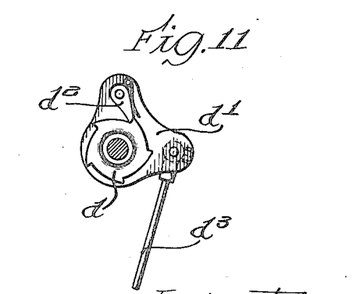
Fig. 11 is a similar view showing the ratchet mechanism for operating the upper feed rolls.
Figure 20:
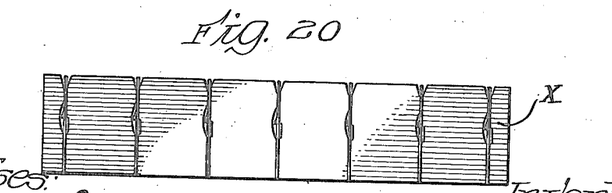
Fig. 20 is a side elevation of the filler shown in Fig. 19.
Figure 22:
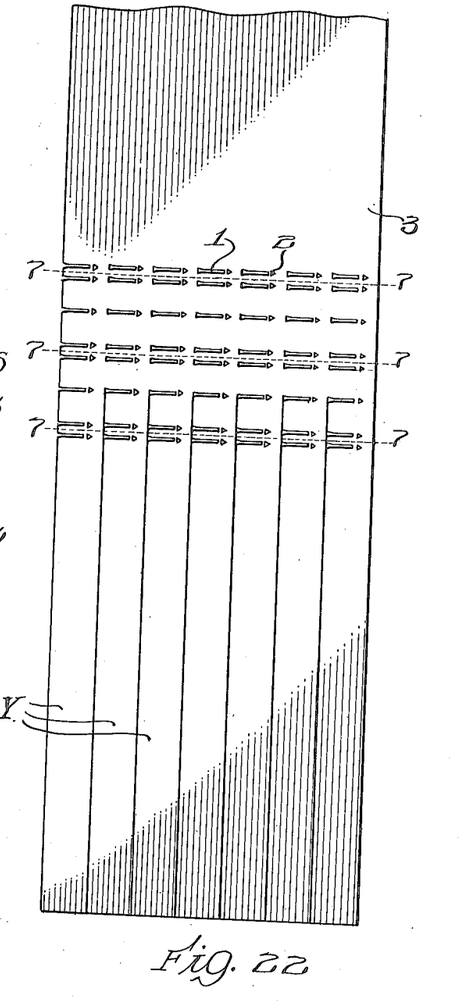
Fig. 22 is a plan of the lower sheet, showing the manner in which the same is subdivided into parallel strips, and in which the sheet is perforated, it being understood that these perforations extend to the forward end of the sheet, whereby each strip is provided with a series of notches which are adapted to interlock with the notches formed in the upper strips.

As thus illustrated, and referring to Fig. 1, it will be seen that my invention comprises a body frame A upon which the various operative parts are supported in suitably elevated positions. The lower sheet of material is fed across a table $a$ and across the stationary die B mounted on the cross bar $b$ below the vertically reciprocating head $b^1$ upon which the punches $b^2$ are mounted. This vertically reciprocating head slides up and down in the guides $a^1$, and is operated by the pitmen $b^3$ connected with the eccentrics $b^4$ on the shaft $b^5$, said shaft being supported in suitable bearings on the frame. These punches, coöperating with the openings in the die B, form the openings 1 and 2 in the sheet 3 shown in Fig. 22. At the same time the upper sheet 4, shown in Fig. 20, is passing over the die $b^6$ above, and below the punches $b^7$, which latter are operated by the head $b^8$ secured to the vertically reciprocating rods $b^9$, the latter having their lower ends fixed to the head $b^1$ below. By these upper punches the openings 5 are formed in the sheet 4, in the manner shown, it being observed that the two sheets are punched simultaneously. The lower sheet is fed by the upper and lower feed rolls C, said rolls being provided with circular knives $c$ that produce the slits in the sheet 3, as shown in Fig. 22, whereby this sheet is subdivided into strips. These rolls are mounted in suitable bearings on the frame, and are operated by the ratchet mechanism shown in Fig. 10, the said mechanism comprising a toothed wheel $c^1$ on the shaft of the lower feed roll, an oscillating plate $c^2$ mounted on the said shaft, and a dog $c^3$ engaging said toothed wheel and pivoted on the said plate. This plate $c^2$ is suitably connected by a rod $c^4$ with a crank plate $c^5$ on the shaft $b^5$, whereby for each upward reciprocation of the said rod, the dog $c^3$ actuates the toothed wheel $c^1$, and thereby causes the feed rolls to feed the sheet 3 forward. It will be seen that this toothed wheel $c^1$ is so formed—that is, that the shape and number of its teeth are such, that every third time the sheet 3 is fed only a short distance, whereby the openings are twice formed the required distance apart, for the cells or compartments of the filler, and then on the fourth stroke of the head are punched close to the last openings, leaving only space enough between for the knives to cut the material without running too close to the openings at opposite sides of the line of severance. The upper feed rolls D are smooth and simply feed the upper sheet 4, said rolls being suitably mounted on the frame. These upper feed rolls are operated by the ratchet mechanism shown in Fig. 11, said mechanism comprising a ratchet wheel $d$ mounted on the shaft of the lower roll D, the plate $d^1$ also mounted on said shaft, and a dog $d^2$ pivoted on said plate. This plate is connected by a rod $d^3$ with the crank plate $d^4$ on the shaft $b^5$ at the bottom of the machine. With this arrangement the feed rolls D are actuated to feed the sheet forward each time the rod $d^3$ moves downward.

Figures 12, 13, 14, 15:
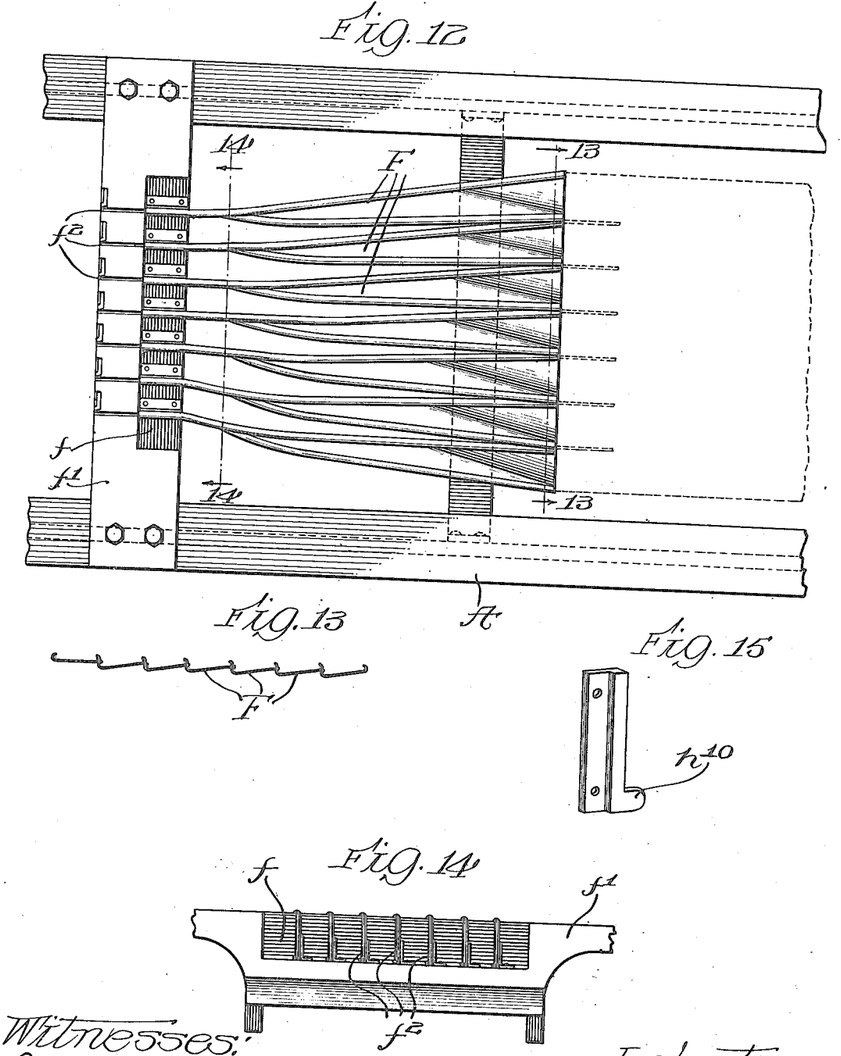
Fig. 12 is a detail plan view of the guides which are provided for twisting the lower strips into position to receive the forward edge of the upper sheet.
Fig. 13 is a detail section on line 13—13 in Fig. 12.
Fig. 14 is a detail section on line 14—14 in Fig. 12.
Fig. 15 is a perspective of one of the stationary knives employed for cutting the lower strips.

The upper sheet 4 is fed forward over a curved table E, and the strips formed by the parallel cuts in the lower sheet are fed to the guides F by which they are twisted over and caused to assume positions in vertical planes with spaces between, whereby they then move forward with their upper edges in position to receive the forward edge of the upper sheet. The forward ends of the guides F are supported in a recess $f$ formed in a solid bar $f^1$, which bar is mounted transversely of the frame of the machine. The said bar is provided with transverse slots $f^2$ that extend in continuation of the guide slots of the said guides F, whereby the strips formed in the lower sheet 3 are caused to pass through the slots in the said solid bar. The curved table E has its forward end supported on a cross bar $e$ on the frame, and below this bar there are feed rolls $e^1$ which retain a firm hold on the forward end portion of the upper sheet, and which coöperate with the feed rolls D to feed the sheet forward from time to time, in a step by step manner, during the operation of combining the upper and lower sheets to form a filler.

Figure 16:
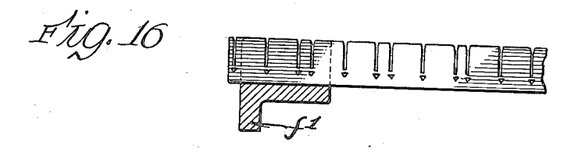
Figs. 16, 17 and 18, illustrate diagrammatically the different steps in the bringing together of the upper and lower sheets of material to cause the cross strips to interlock with the longitudinal strips in the manner shown, the upper strips being cut from the edge of the upper sheet, and the lower strips then severed after three of the upper or lower strips have been applied.
Figure 17:
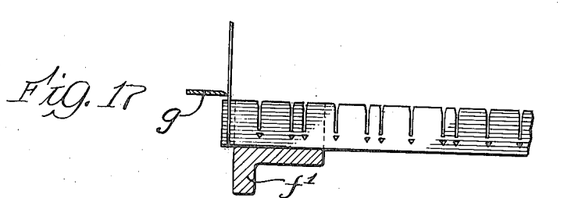
Figure 18:
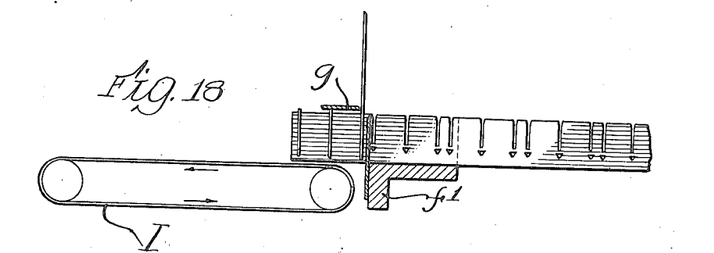
Figure 19:
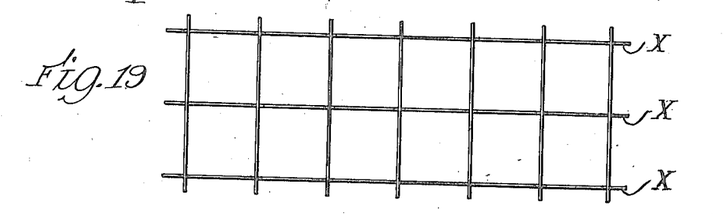
Fig. 19 is a plan of a filler of the kind made by a machine embodying the principles of my invention.
Figure 21:
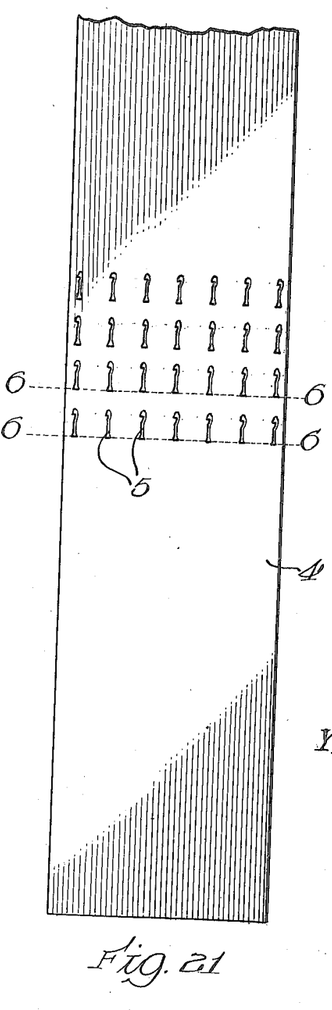
Fig. 21 is a plan of the upper sheet, showing the manner in which the same is punched or perforated, it being understood that these perforations extend to the forward end of the sheet, and that when a strip it cut off, the cutting is done along the line which intersects the forward ends of the said perforations.

The feed rolls $e^1$ are operated by a sprocket chain connection $e^2$ with the shaft $e^3$ on the frame of the machine, which shaft is driven in any suitable manner. It will also be observed that the outer rolls $e^1$ are mounted on a shaft $e^4$, and that the ends of said shaft are mounted in bearings $e^5$ which slide back and forth in the slots $e^6$ in the brackets $e^7$, springs $e^8$ being applied to said bearings to keep the rolls tight together. A slot is provided for the upper sheet, immediately below the rolls $e^1$, said slot being formed by a stationary front plate $e^9$, and by a pivoted back plate $e^{10}$, the latter being mounted to swing upon a horizontal axis $e^{11}$ at its upper edge. This back plate is yieldingly held in position by the springs $e^{12}$, and its lower edge is normally adjacent the cutting edge of the stationary knife G, which overlies the slots $f^2$ of the bar $f^1$, and which is secured to said bar. The movable knife $g$ is mounted forward of the plate $e^9$, and in position to move toward the knife G, the cutting edge of the knife $g$ passing below the plate $e^9$, and pushing the plate $e^{10}$ backward in order to sever the material. After three long strips have been cut off by these knives, like the strips X shown in Figs. 19 and 20, the strips Y of the lower sheet are then cut by the knives H which are pivoted at $h$ upon the bar $f^1$, and which coöperate with the stationary knives $h^1$, which latter are also secured to said bar. The lower ends of these knives $h$ are all pivotally connected together by a bar $h^2$, which latter is in turn connected by a link $h^2$ with the upper end of the lever $h^4$, which latter is pivoted at $h^5$ upon the frame, and has its lower end portion $h^6$ adapted to engage the groove $h^7$ in the cam $h^8$ on the shaft $h^9$, said shaft being operated by a suitable gear connection with the shaft $b^5$, or in any other suitable manner. It will be seen that each stationary knife $h^1$ has a heel portion $h^{10}$ upon which the coöperating pivoted knife or blade $h$ normally rests, and which forms a support for the lower edge of the strip of material passing through the slot formed between the two knives, and through the slot in the bar $f^1$, as previously described. As shown in Figs. 16, 17 and 18, the operation of the machine and the timing of the various movements thereof, are such that three of the strips X are cut off and applied to the strips Y by interlocking their edges, in the well known manner, before the strips Y are cut by the knives H, whereby a filler of the kind shown in Figs. 19 and 20 is made. The knives G and $g$ cut the upper sheet 4 on the lines 6, shown in Fig. 21, it being observed that these lines intersect the forward ends of the openings 5, whereby these openings are converted into notches which engage the notches formed in the strips Y, this being an ordinary and well known form of filler. The knives H coöperate with the stationary knives $h^1$ to cut the strips Y along the lines 7, shown in Fig. 22, it being observed that these lines are located between the successive openings or perforations which are formed close together, and not between those which are wide apart, as these narrow spaces are provided for this particular purpose. The knife $g$ is mounted on a slide $g^1$, which reciprocates in the guides $g^2$ formed on the frame of the machine, and which is operated by a link $g^3$ pivotally secured thereto. This link has its other end pivotally connected with the crank arm $g^4$ on the rock shaft $g^5$, which latter has another crank arm $g^6$ which is connected by a rod $g^7$ with the plate $c^2$, whereby this plate serves as a medium of connection for operating the said knife. The swinging plate $e^{10}$ is provided with vertical guides $e^{13}$ which engage the side edges of the upper strip 4 to hold the same against lateral displacement, and which engage the plate $c^9$ to space the two plates apart. Thus the timing and adjustment of the different feeding and cutting devices is such that three long strips are applied to the strips Y, and the latter are then cut off, forming the filler and leaving the materials in position to feed forward to form the next filler. The knife $g$ reciprocates back and forth above the partially formed filler, as it moves out from under the knife G and the plate $e^9$, and the finished filler is then dropped on to the belt I and discharged from the machine. This belt is operated by a sprocket connection $i$ with the shaft $h^9$, which latter, as previously stated, is gear connected with the shaft $b^5$, this gear being proportioned to operate the machine in the manner described.

Thus it will be seen that, in a machine embodying the principles of my invention, both the upper and lower sheets are punched at the same time, and by practically one and the same punching head, whereby it is only necessary to feed the blank sheets of paper to the machine, and whereby these operations are synchronized to insure greater accuracy and certainty in the subsequent operations of interlocking and cutting the materials where the two sheets come together in the form of longitudinal and transverse strips. The machine can, of course, be adjusted or varied in its construction to produce cartons of different sizes and shapes.

I do not limit myself to the exact construction shown and described.

What I claim as my invention is:—

1. A carton machine comprising means for feeding parallel strips, means for feeding a sheet edgewise into engagement with said strips, crosswise thereof, means for cutting off the engaging portion of the sheet, after said portion has reached its final position in the carton, means for cutting off the end portions of said strips after a plurality of portions of said sheet have been applied thereto, and means for completely punching the sheet before it engages said feeding means therefor.

2. A carton machine comprising means for intermittently feeding parallel strips, means for feeding a sheet edgewise into engagement with said strips, crosswise thereof, means for cutting off the engaging portion of the sheet while the sheet and strips are interlocked and stationary, means for cutting off the end portions of said strips after a plurality of portions of said sheet have been applied thereto, the means for feeding the strips being connected for operating the means for cutting the sheet.

3. A carton machine comprising means for feeding parallel strips, means for feeding a sheet edgewise into engagement with said strips, crosswise thereof, means for cutting off the engaging portion of the sheet, and means for cutting off the end portions of said strips after a plurality of portions of said sheet have been applied thereto, disposed in position to operate in rear of the last portion of said sheet, the means for feeding the strips being provided with intermittently operated knives for cutting the strips from a sheet of material, connected for operating the means for cutting the sheet.

4. A carton machine comprising means for feeding parallel strips, means for feeding a sheet edgewise into engagement with said strips, crosswise thereof, means for cutting off the engaging portion of the sheet, after said portion has reached its final position in the carton, means for cutting off the end portions of said strips after a plurality of portions of said sheet have been applied thereto, the means for feeding the sheet comprising a stationary front plate, a swinging back plate, said plates disposed a distance apart to form a slot between them, means for directing the sheet into said slot, means on one of said plates for engaging the edges of the sheet, and a spring for yieldingly holding said back plate in operative position.

5. A carton machine comprising means for feeding parallel strips, means for feeding a sheet edgewise into engagement with said strips, crosswise thereof, means for cutting off the engaging portion of the sheet, means for cutting off the end portions of said strips after a plurality of portions of said sheet have been applied thereto, after said portion has reached its final position in the carton, the means for feeding the sheet comprising a curved table having a downturned delivery end, and continuously operating feed rolls which receive the sheet directly from said table.

6. A carton machine comprising means for feeding parallel strips, means for feeding a sheet edgewise into engagement with said strips, crosswise thereof, means for cutting off the engaging portion of the sheet, after said portion has reached its final position in the carton, means for cutting off the end portions of said strips after a plurality of portions of said sheet have been applied thereto, the means for feeding the sheet comprising a plate having guides thereon for engaging the side edges of the sheet, pivoted in position to receive the perforated sheet directly from said feeding means therefor.

7. A carton machine comprising means for feeding parallel strips, means for feeding a sheet edgewise into engagement with said strips, crosswise thereof, means for cutting off the engaging portion of the sheet, after said portion has reached its final position in the carton, means for cutting off the end portions of said strips after a plurality of portions of said sheet have been successively applied thereto, the means for feeding the strips comprising a member with a plurality of guide slots, disposed in front of said means for cutting the strips, and a plate overlying said slots, secured to said member, forming part of said means for cutting the strips.

8. A carton machine comprising means for feeding parallel strips, means for feeding a perforated sheet edgewise into engagement with said strips, crosswise thereof, means for cutting off the engaging portion of the sheet, means for cutting off the end portions of said strips after a plurality of portions of said sheet have been applied thereto, disposed in position to operate in rear of the last portion of said sheet, the means for feeding the sheet comprising a curved table having a downturned end, a set of continuously operating feed rolls below said delivery end, for receiving the perforated sheet directly therefrom, and a set of intermittently operating feed rolls at the other end of said table.

9. A carton machine comprising a feed table, mechanism for intermittently and positively feeding a sheet, disposed at the receiving end of said table, a friction feed device at the delivery end of said table, acting on said sheet, means for continuously operating said device, means for cutting off the end portion of said sheet, and means for holding strips in position to receive said end portions.

10. A carton machine comprising means for feeding parallel strips, means for punching a sheet, means for receiving and feeding the perforated portion of the sheet edgewise into engagement with said strips, crosswise thereof, as far as the sheet can enter, means for cutting off the engaging portion of the sheet, after said portion has reached its final position in the strips, and means for cutting off the end portions of said strips after a plurality of portions of said sheet have been applied thereto.

11. A carton machine comprising means for feeding parallel strips, continuously operating means for feeding a sheet edgewise into engagement with said strips, crosswise thereof, as far as the sheet can enter, means for cutting off the engaging portion of the sheet, after said portion has reached its final position in the strips, means for cutting off the end portions of said strips after a plurality of portions of said sheet have been applied thereto, and mechanism for punching said sheet and strips before they come together, disposed in position whereby a plurality of successive punching operations are performed on said sheet before the first set of perforations reaches the said strips.

12. A carton machine comprising means for feeding parallel strips, means for feeding a sheet edgewise into engagement with said strips, crosswise thereof, means for cutting off the engaging portion of the sheet, means for cutting off the end portions of said strips after a plurality of portions of said sheet have been applied thereto, disposed in position to operate immediately in rear of the last portion of said sheet, before another portion thereof is cut off, and mechanism for punching the said sheet and strips before they come together, disposed in position whereby a plurality of successive punching operations are performed on said sheet before the first set of perforations reaches the said strips.

13. A carton machine comprising means for feeding parallel strips, means for feeding a sheet edgewise into engagement with said strips, crosswise thereof, means for cutting off the engaging portion of the sheet, means for cutting off the end portions of said strips after a plurality of portions of said sheet have been applied thereto, disposed in position to operate immediately in rear of the last portion of said sheet, before another portion thereof is cut off, a pair of punching heads disposed one above the other, the upper head for punching the sheet, and the lower head for punching the strips, the two heads being rigidly connected together, and means for operating said heads, the said upper head being disposed a distance from said means for cutting the sheet, whereby a plurality of successive punching operations are performed on said sheet before the first set of perforations reaches said strips.

14. A carton machine comprising means for feeding parallel strips, means for punching a sheet, means for receiving and feeding the perforated portion of the sheet edgewise into engagement with said strips, crosswise thereof, as far as the sheet can enter, means for cutting off the engaging portion of the sheet, after said portion has reached its final position in the strips, and means for cutting off the end portions of said strips after a plurality of portions of said sheet have been applied thereto, means for punching the strips, and means for cutting the strips apart after they are punched.

15. A carton machine comprising means for feeding parallel strips, continuously operating means for feeding a sheet edgewise into engagement with said strips, crosswise thereof, as far as the sheet can enter, means for cutting off the engaging portion of the sheet, after said portion has reached its final position in the strips, and means for cutting off the end portions of said strips after a plurality of portions of said sheet have been applied thereto, the means for cutting off the strips comprising a set of pivoted blades, one for each strip, a stationary blade for each pivoted blade, means for operating said pivoted blades in unison, and a bar having transverse slots for said strips, upon which said blades are mounted, said bar having recesses in which said stationary blades are disposed, and the means for cutting the sheet including a stationary blade on said bar.

16. A carton machine comprising means for feeding parallel strips, means for feeding a perforated sheet edgewise into engagement with said strips, crosswise thereof, means for cutting off the engaging portion of the sheet, after said portion has reached its final position in the strips, means for cutting off the end portions of said strips after a plurality of portions of said sheet have been applied thereto, pivoted means permitting displacement of the sheet from the feeding position, when the forward edge portion is cut off, disposed below the means for feeding the perforated sheet, and a spring for returning the sheet to feeding position.

17. A carton machine comprising means for feeding parallel strips, means for punching a sheet, means for receiving and feeding the perforated portion of the sheet edgewise into engagement with said strips, crosswise thereof, means for cutting off the engaging portion of the sheet, after said portion has reached its final position in the strips, and means for cutting off the end portions of said strips after a plurality of portions of said sheet have been applied thereto, and means for twisting the strips into vertical planes before they are engaged by said sheet, to permit complete insertion of said perforated sheet before being cut off.

18. A carton machine comprising means for feeding parallel strips, means for punching a sheet, continuously operating means for receiving and feeding the perforated portion of the sheet edgewise into engagement with said strips, crosswise thereof, as far as the sheet can enter, means for cutting off the engaging portion of the sheet, after said portion has reached its final position in the strips, means for cutting off the end portions of said strips after a plurality of portions of said sheet have been applied thereto, means for cutting the strips from a sheet of material, and means for then twisting the strips into position for receiving the sheet.

19. A carton machine comprising means for feeding parallel strips, means for punching a sheet, means for receiving and feeding the perforated portion of the sheet edgewise into engagement with said strips, crosswise thereof, means for cutting off the engaging portion of the sheet, after said portion has reached its final position in the strips, means for cutting off the end portions of said strips after a plurality of portions of said sheet have been applied thereto, and means for punching the strips before they engage said cutting means thereof.

20. A carton machine comprising means for feeding parallel strips, means for feeding a sheet edgewise into engagement with said strips, crosswise thereof, means for cutting off the engaging portion of the sheet, means for cutting off the end portions of said strips after a plurality of portions of said sheet have been applied thereto, disposed in position to operate immediately in rear of the last portion of said sheet, before another portion thereof is cut off for another carton, and a solid bar upon which said means for cutting the strips are mounted, provided with a vertical slot for each strip, the means for cutting the sheet comprising a stationary blade overlying the said slots, having a cutting edge which overhangs the means for cutting the sheet.

21. A carton machine provided with upper and lower punching heads, a rigid connection between said heads, devices for feeding sheet material below said heads, disposed in position to receive the sheet material from said heads, means connected with one head for operating both heads, means for reducing the lower sheet to strips, means for feeding the end of the upper sheet into said strips, means for cutting off the end of the upper sheet, after the same reaches its final position in the strips, and means for severing the finished carton from the lower sheet.

22. A carton machine comprising mechanism for intermittently feeding a sheet, provided with means for cutting the sheet into parallel strips, means for feeding a second sheet into said strips, a member for cutting off the end of said second sheet, after the same reaches its final position in the strips, a ratchet device including an oscillating element for operating said mechanism, a connection between said element and said member, means for operating said element, and means for punching said sheets before they are severed by said cutting means.

23. A carton machine comprising means for feeding parallel strips, means for punching a sheet, means for receiving and feeding the perforated portion of the sheet into engagement with said strips, means for engaging both sides of the sheet, to prevent buckling of the sheet immediately above the strips, a reciprocating element for cutting off the end of said sheet, while the sheet and strips are interlocked and stationary, and after the end of the sheet reaches its final and permanent position in the carton, mechanism for cutting the strips in rear of the last severed end of the sheet, and means for operating said mechanism.

24. A carton machine comprising means for feeding parallel strips, means for feeding a sheet into engagement with said strips, a reciprocating element for cutting off the end of said sheet, while the sheet and strips are interlocked and stationary, and after the end of the sheet reaches its final and permanent position in the strips, mechanism for cutting the strips in rear of the last severed end of the sheet, and means for operating said mechanism, together with a pivoted member which serves as a yielding backing for the unsevered portion of the sheet, movable with said element, adapted to receive the sheet directly from said feeding means therefor.

25. A carton machine comprising continuously operating mechanism for feeding a perforated sheet, means for causing the sheet to move intermittently, a reciprocating knife for cutting said sheet, to sever the end portion therefrom, and means whereby the unsevered and perforated portion of the sheet is free to move with the knife, disposed in a position to receive the unsevered end portion of the sheet directly from said feeding mechanism, and means for holding strips in position to receive the end of said sheet.

26. A carton machine comprising continuously operating mechanism for feeding a perforated sheet, intermittent feeding means acting on said sheet before it reaches said mechanism, a reciprocating knife for cutting said sheet, to sever the end portion therefrom, and means whereby the unsevered portion of the sheet is free to move with the knife, said means including a pivoted backing for the sheet, disposed in position to receive the unsevered end portion of the sheet directly from said feeding mechanism, and a spring for yieldingly holding said backing in place, and means for holding strips in position to receive the end of said sheet.

27. A carton machine comprising mechanism for feeding a sheet, a reciprocating knife for cutting said sheet, to sever the end portion therefrom immediately below said mechanism, and means whereby the unsevered portion of the sheet is free to move with the knife, said means including a pair of plates forming a guide slot between them, the rear plate being movable, and said plates having space between them, serving to guide the edges of the sheet, and means for holding strips in position to receive the end of said sheet directly from said plates.

28. A carton machine comprising means for holding strips in position, means for feeding the end of a sheet into engagement with said strips, mechanism for cutting off the end of the sheet, after the same reaches its required position in said strips, and means for performing a plurality of punching operations on said sheet before it reaches said mechanism, to form openings which are transformed into notches by said mechanism, means for feeding said strips into position, devices for cutting said strips to detach the finished carton, and means for previously forming notches in said strips, to receive said first mentioned notches, rigidly connected with said punching means.

29. A carton machine comprising means for holding strips in position, means for feeding the end of a sheet into engagement with said strips, mechanism for cutting off the end of the sheet, after the same reaches its required position in said strips, and means for performing a plurality of successive punching operations on said sheet before it reaches said mechanism, pitmen for operating said punching means, means for causing said sheet to move intermittently, and means for previously punching said strips, operated by said pitmen.

30. A carton machine comprising means for holding strips in position, means for guiding the end of a sheet into engagement with said strips, mechanism for cutting off the end of the sheet, after the same reaches its required position in said strips, and means for performing a plurality of punching operations on said sheet before it reaches said mechanism, to form openings which are transformed into notches by said mechanism, means for intermittently actuating said feeding means, and continuously driven feed rolls acting on said sheet adjacent said mechanism.

31. A carton machine comprising means for holding strips in position, means for feeding the end of a sheet into engagement with said strips, mechanism for cutting off the end of the sheet, after the same reaches its required position in said strips, and means for performing a plurality of punching operations on said sheet before it reaches said mechanism, means including a ratchet for feeding the strips, and means whereby said mechanism is operated by an element of said ratchet.

32. A carton machine comprising means for holding strips in position, means for feeding the end of a sheet into engagement with said strips, mechanism for cutting off the end of the sheet, after the same reaches its required position in said strips, and means for performing a plurality of successive punching operations on said sheet before it reaches said mechanism, a set of devices for providing notches in said strips, means for feeding the strips, feed rolls for causing said sheet to move intermittently, and a rigid connection between said punching means and said devices.

33. A carton machine comprising feed rolls for causing said sheet to move intermittently, means for holding strips in position, means for feeding the end of a sheet into engagement with said strips, mechanism for cutting off the end of the sheet, after the same reaches its required position in said strips, arranged immediately below said means, and means for performing a plurality of successive punching operations on said sheet before it reaches said mechanism, a pivoted guide for receiving the perforated sheet from said feeding means, and a spring for yieldingly holding said guide in position.

34. A carton machine comprising means for holding strips in position, means for feeding the end of a sheet into engagement with said strips, mechanism for cutting off the end of the sheet, after the same reaches its required position in said strips, and means for performing a plurality of punching operations on said sheet before it reaches said mechanism, to form openings which are transformed into notches by said mechanism, said feeding means including a continuously driven pair of rolls, and means whereby said sheet is permitted to move intermittently only.

Signed by me at Chicago, Illinois, this 2nd day of January, 1913.

HALGE S. AXCELL.

Witnesses:
H. KNUDSON,
J. NORBY.